UNITED STATES PATENT OFFICE.

WILLIAM HOSKINS, OF CHICAGO, ILLINOIS, ASSIGNOR TO THE BEST BROTHERS KEENE'S CEMENT COMPANY, OF MEDICINE LODGE, KANSAS, A CORPORATION OF KANSAS.

MANUFACTURE OF QUICK-SETTING KEENE'S CEMENT.

1,300,269.     Specification of Letters Patent.     Patented Apr. 15, 1919.

No Drawing.     Application filed May 13, 1918. Serial No. 234,257.

*To all whom it may concern:*

Be it known that I, WILLIAM HOSKINS, a citizen of the United States, residing at Chicago, in the county of Cook and State of Illinois, have invented a new and useful Improvement in the Manufacture of Quick-Setting Keene's Cement, of which the following is a specification.

My present invention relates to the manufacture of a Keene's cement, which will have a setting time appreciably shorter than has hitherto been obtainable for satisfactory products of this nature. I have discovered that it is possible to substantially accelerate the setting of Keene's cement by the addition thereto of a small proportion of a strongly acid salt, the acid apparently increasing the solubility of the burnt gypsum, and thereby expediting the solution and crystallization or allied phenomena to which the "setting" is believed to be due.

The preferred setting agent of my invention is commercial potassium sulfate containing approximately an excess of 15% of sulfuric acid. This material when employed in proportions of approximately 2% on the weight of the burnt gypsum produces a highly desirable quick-setting product. The setting time may be still further decreased by raising the acid content. It is permissible for many uses to which the cement is put to employ a potassium sulfate containing up to 25% excess acid.

A further decrease in the setting time may be obtained by the addition to the products described of from two to ten per cent. of plaster of Paris, it being possible to employ the maximum proportion named without seriously impairing the strength of the product and without sacrifice of the re-tempering quality, *i. e.*, that property of the cement by virtue of which it may be re-worked after having assumed an initial set.

The quick-setting Keene's cement products above described have a setting time so short as to permit their substitution for plaster of Paris in certain uses, such, for example, as surgical cements, this decrease in the setting time being accomplished without the sacrifice of those qualities which distinguish Keene's cement from plaster of Paris.

What I claim is:

1. A quick-setting grade of Keene's cement comprising an admixture of finely-divided calcined gypsum, and a catalyst comprising a salt containing an amount of acid in excess of that necessary for the formation of a normal salt and not exceeding one-half of that necessary for the formation of an acid salt.

2. A quick-setting grade of Keene's cement comprising a mixture of finely-divided calcined gypsum and potassium sulfate containing excess sulfuric acid to an amount not greater than one-half of that necessary for the formation of an acid salt.

3. A quick-setting grade of Keene's cement comprising finely-divided calcined gypsum admixed with two per cent. by weight of potassium sulfate containing approximately fifteen per cent. excess sulfuric acid.

4. A quick-setting grade of Keene's cement comprising a finely-divided calcined gypsum admixed with approximately two per cent. by weight of potassium sulfate containing approximately fifteen per cent. excess sulfuric acid, and from two to ten per cent. by weight of plaster of Paris.

WILLIAM HOSKINS.